United States Patent
Schock et al.

(10) Patent No.: US 9,682,680 B2
(45) Date of Patent: Jun. 20, 2017

(54) METHOD FOR FOLDING UP AN AIRBAG, AND AN AIRBAG UNIT

(71) Applicant: Autoliv Development AB, Vårgårda (SE)

(72) Inventors: Marc Schock, Karlsfeld (DE); Jürgen Mackensen, Dachau (DE); Raimund Nebel, Obermeitingen (DE); Andreas Guggenberger, München (DE); Daniel Schwerdtfeger, Fürstenfeldbruck (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/025,023

(22) PCT Filed: Sep. 23, 2014

(86) PCT No.: PCT/EP2014/070204
§ 371 (c)(1),
(2) Date: Mar. 25, 2016

(87) PCT Pub. No.: WO2015/044117
PCT Pub. Date: Apr. 2, 2015

(65) Prior Publication Data
US 2016/0236642 A1 Aug. 18, 2016

(30) Foreign Application Priority Data
Sep. 27, 2013 (DE) .......................... 10 2013 016 054

(51) Int. Cl.
*B60R 21/237* (2006.01)

(52) U.S. Cl.
CPC ................................ *B60R 21/237* (2013.01)

(58) Field of Classification Search
CPC ................................................... B60R 21/237
See application file for complete search history.

(56) References Cited

U.S. PATENT DOCUMENTS

| 5,290,061 A | * | 3/1994 | Bollaert | B60R 21/237 280/743.1 |
| 5,613,707 A | * | 3/1997 | Berti | B60R 21/237 280/743.1 |
| 5,681,052 A | | 10/1997 | Ricks et al. | |

(Continued)

FOREIGN PATENT DOCUMENTS

| DE | 44 22 276 A1 | 12/1994 |
| DE | 44 40 844 A1 | 5/1996 |

(Continued)

OTHER PUBLICATIONS

German Examination Report—Aug. 1, 2014.
PCT International Search Report—Jun. 26, 2014.

*Primary Examiner* — James English
(74) *Attorney, Agent, or Firm* — Brinks Gilson & Lione

(57) ABSTRACT

An airbag unit and method for folding up a driver's airbag, which has an insertion opening for a gas generator and, after activation of the gas generator, is unfolded away therefrom in the direction of a user. The airbag is folded around an imaginary center in alternating directions along first folding lines running around the imaginary center and is compressed in the direction of the center. At least one partial region of the airbag is rolled up or folded over onto the side towards the insertion opening.

13 Claims, 2 Drawing Sheets

(56) References Cited

U.S. PATENT DOCUMENTS

| | | | | |
|---|---|---|---|---|
| 5,690,358 A | * | 11/1997 | Marotzke | B60R 21/237 |
| | | | | 280/728.1 |
| 6,092,839 A | * | 7/2000 | Nagano | B60R 21/237 |
| | | | | 280/743.1 |
| 6,171,228 B1 | * | 1/2001 | Marotzke | B60R 21/237 |
| | | | | 280/728.1 |
| 6,179,322 B1 | * | 1/2001 | Faigle | B60R 21/217 |
| | | | | 280/728.2 |
| 7,571,933 B2 | * | 8/2009 | Thomas | B60R 21/203 |
| | | | | 280/743.1 |
| 2009/0189371 A1 | | 7/2009 | Budowick | |
| 2012/0096735 A1 | * | 4/2012 | Nebel | B60R 21/237 |
| | | | | 34/357 |

FOREIGN PATENT DOCUMENTS

| | | |
|---|---|---|
| DE | 195 35 565 A1 | 3/1997 |
| DE | 198 06 997 A1 | 9/1998 |
| EP | 0 829 396 B1 | 3/1997 |

\* cited by examiner

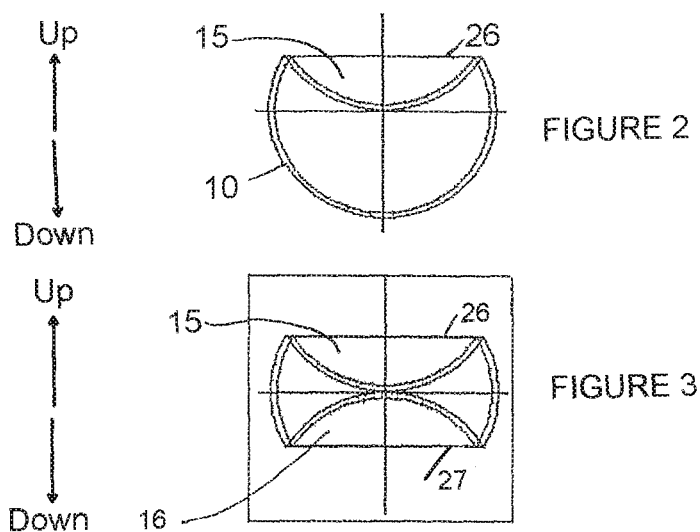

METHOD FOR FOLDING UP AN AIRBAG, AND AN AIRBAG UNIT

CROSS REFERENCE TO RELATED APPLICATIONS

This application claims priority to German Patent Application No. 10 2013 016 054.5, filed Sep. 27, 2013 and PCT International Application No. PCT/EP2014/070204, filed on Sep. 23, 2014.

FIELD OF THE INVENTION

The invention relates to a method for folding a driver airbag, which includes an insertion opening for a gas generator and deploys away therefrom towards a user after activation of the gas generator, as well as an airbag unit including a gas generator and an airbag.

BACKGROUND

Airbags serve to protect occupants, in particular vehicle occupants, in the event of accidents. In the event of an accident, a folded airbag is filled with deployment gas via a gas generator, for example in the form of a compressed air reservoir or a pyrotechnic gas generator. The airbag is folded in a housing or in a shell, which is torn after activation of the gas generator, and is positioned between the user and the vehicle structure, for example a steering wheel or an instrument panel. In combination with a seatbelt, the airbag is a protection device that protects against impact with the vehicle structure or reduces the impact.

A prerequisite for the optimal functioning of the airbag is that it deploys promptly and completely between the user and the vehicle structure. The very small time period that is available is therefore further reduced if the user is not in the usual upright and reclined position but assumes a position deviating therefrom, in which the user is located closer to the vehicle structure. The so-called out-of-position (OOP) posture can cause the user to be impacted by the deploying airbag with a force counter to the direction of travel, which should be avoided.

In the case of a driver airbag, if the user's head is in the vicinity of the steering wheel, the airbag can be entrapped beneath the chin of the user or exert pressure on the chest. If deployment should be delayed, there is the possibility that the lower region of the steering wheel is not covered quickly enough, and the user can come into contact with the steering wheel.

In addition, there is the basic problem that space-saving folding must be provided, by which high repeatability of the deployment method can be realized with a small packaging space requirement.

DE 44 22 276 A1 relates to an airbag and a method for folding airbags wherein in a first step an essentially flatly spread, inflatable airbag is folded along main fold lines that run around an imaginary center. The airbag prefolded in this manner is subsequently at least partially folded or pressed into the desired final shape over secondary fold lines that cross the main fold lines.

The object of the present invention is to achieve secure deployment even in OOP situations, and in particular to provide a reduced risk of injury with a driver airbag having limited deployment possibilities.

This object is inventively achieved by a and an airbag unit as described herein.

SUMMARY

The inventive method for folding a driver airbag, which includes an insertion opening for a gas generator, and which, after activation of the gas generator, deploys away therefrom towards a user, wherein the airbag is folded in alternating directions around an imaginary center along first fold lines encircling the imaginary center and pressed together towards the center, provides that at least one portion of the airbag is rolled or folded on the side of the insertion opening and thus, when viewed in the installed state, away from the user. In addition to the advantageous zig-zag-type or accordion type folding along first fold lines around a center of the airbag and subsequent compression by pushing or pressing together towards the center, it is inventively provided that a portion, for example, the upper part of a spread-out, not yet folded airbag is rolled or folded towards the side of the insertion opening away from the user so that an initial deployment first occurs away from the user. The rolled-up or folded-up portion lies on the side facing away from the user. If the user is in an OOP situation, during unrolling, deployment or unfolding away from the user ensures that the airbag, for example, is not entrapped beneath the chin of the user and does not exert force on the chest region. Folding or rolling away from the user means that the rolling-up direction or the folding direction is usually towards the gas generator, which in the installed situation is located on the side of the airbag facing away from the user. If the airbag or the airbag unit is a driver airbag, this is generally disposed in the hub of the steering wheel. The rolling or folding direction of the rolled or folded portion provides that the front side is folded over or rolled towards the back, so that the rolled-up edge points back to the side of the airbag facing away from the user, and lies on the side of the airbag where the insertion opening is usually located.

A further development of the invention provides that in addition to a first portion, a second portion opposite the first portion of the airbag is also rolled up or folded away from the user in an analogous manner to that of the first portion, in order once again to ensure that entrapment of body parts does not occur. In the driver airbag embodiment, the corresponding portion can deploy behind the steering wheel rim and prevents entrapment in OOP situations. With normal deployment, in which the user is in the usual situation, the airbag deploys in front of the steering wheel or the vehicle structure and represents a conventional airbag.

In the installed state the first partial airbag is advantageously positioned above, wherein "above" in the normal installed situation of the airbag is understood to mean from the perspective of a user sitting upright in the vehicle.

After folding in alternating directions, for example, in concentric rings, and pressing together, the at least one portion can again be spread out flat and subsequently rolled or folded up. This has the advantage that it can be precisely established how large the portion is. Furthermore it can be ensured that due to the folding and pushing, no undesired folds are introduced into an already rolled- or folded-together partial section, which could change the desired deployment behavior.

Alternatively to subsequent handling of an in fact already finished and folded airbag, it is possible that prior to folding in alternating directions and pressing together, the at least one portion is rolled or folded up in advance, which has the advantage that the downstream operating processes need not be changed.

The at least one portion can be folded up or rolled up multiple times in order to bring the portion to the desired size.

The inventive airbag unit including a gas generator and an airbag that has an insertion opening for the gas generator and deploys towards a user after activation of the gas generator, wherein the airbag is folded in alternating directions around an imaginary center along first fold lines extending around the imaginary center and is pressed together towards the center, provides that at least one portion of the airbag is rolled towards the side of the insertion opening or along second fold lines. Due to the folding or rolling towards the insertion opening side, an advantageous deployment behavior arises that has already been described above.

Mutually opposing portions of the airbag can be rolled away from the user or folded up along second fold lines towards the insertion opening side in order, for example when they are arranged in a steering wheel, to prevent entrapment in the steering-wheel rim as well as to ensure accelerated deployment of the lower, i.e. leg-oriented portion, in order to keep the legs or lower body from coming into direct contact with a vehicle structure.

Using multiple foldings and multiple rollings, a small installation space can be achieved; and the airbag unit is advantageously configured as a driver airbag unit that is disposed in a steering wheel hub.

BRIEF DESCRIPTION OF THE DRAWINGS

Exemplary embodiments of the invention are explained in more detail below with reference to the accompanying Figures:

FIG. 2 shows a variant including folded portion; and

FIG. 3 shows a variant including two folded portions.

DETAILED DESCRIPTION

Figure 1:
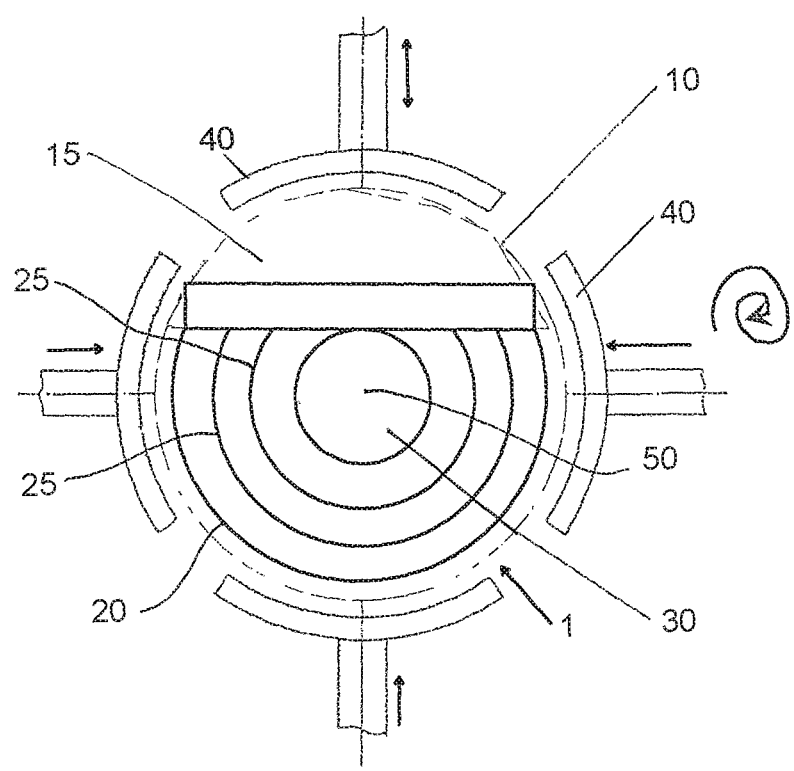
FIG. 1 shows a schematic folding process in a folding direction.

In FIG. 1 an airbag 1 is shown in a folded state. An initially flat airbag 1 having a circular outer contour 10 is folded along first fold lines 25 in opposite directions around an imaginary center 50. This happens, for example, in that the airbag 1 is inserted between two mold halves provided with concentric ring ridges. The ring ridges have different diameters so that an upper ring ridge and a lower ring ridge are disposed adjacent to each other in an alternating manner and are compressed one into the other. There is sufficient space between the ring ridges to fold an airbag. Examples of the fold lines 25 are shown; the inner fold lines 25 can extend out of the drawing plane, the outer fold lines 25 can project downward. Folding reduces the diameter of the airbag 1, so that the outer contour 20, pre-folded after the first folding process, has a smaller diameter than the unfolded outer contour 10.

A gas generator 30 is disposed inside the airbag and can be configured as a cylindrical gas generator. The gas generator is inserted into an insertion opening, not detailed more closely, and partially protrudes out of the airbag 1 in order to give access to electrical terminals and mounting provisions, for example. In the depicted position, the airbag 1 with the front side, which in the installed state and after deployment lies opposite the user is opposite the back side of the airbag 1 which is shown; the gas generator 30 protrudes partially out of the drawing plane toward the viewer.

After folding in opposite directions, four slides 40 are moved radially from the outside in towards the center 50 in order to bring the airbag 1 to the desired size. The contour of the slides 40 can be adjusted to the desired shape of the finished folded and assembled airbag. The exemplary embodiment that is shown calls for an essentially round shape, so the contact surfaces of the slides 40 are configured as semi-circular segments.

After folding and pushing together, a slide 40, in the exemplary embodiment the upper slide depicted in the 12 o'clock position, is pulled back, the already folded and compressed portion 15 is uncompressed and unfolded and rolled towards the back, wherein the back side of the airbag 1 facing away from the user is rolled inward, which is indicated by the spiral arrow. The portion 15 is thus rolled or folded from outside in towards the gas generator 30 or the back side of the airbag 1, such that a portion of the front side of the airbag 1 is placed on the back side of the airbag. The folded or rolled state in the direction of the side of the insertion opening or rear side is depicted in FIG. 1 by the solid line.

Alternatively to rolling, the portion 15 can also be folded. Likewise, alternatively to rolling of the portion 15, after prior compression, rolling can already occur prior to folding along the first fold lines 25 and compression or pressing by means of the slides 40.

FIG. 2 shows the exemplary embodiment according to FIG. 1, wherein instead of rolling, folding of the first portion 15 along a first fold edge 26 is depicted. The fold line 26 diverges from and crosses the encircling first fold lines 25; a segment of the spread-out airbag 10 is folded inward toward the rear of the airbag toward its center. The contour 10 not yet alternatingly folded along the first fold lines is depicted in FIG. 2.

A variant of the invention is depicted in FIG. 3, wherein two opposite portions 15, 16 are folded towards each other. Two second fold edges 26, 27 are thus formed. After turning and folding of the two portions 15, 16, alternating folding about the first fold line 25 and pushing together into the desired shape are carried out.

Alternatively to one-time folding along the second fold lines 26 and 27, multiple folding or multiple rolling along a plurality of parallel second fold edges 26 and 27 or about a rolling axis can also occur. The rolling axis drifts in the direction of the imaginary center 50 and forms a secant with an assumed circular shape of the airbag 10.

Alternatively to the depicted embodiment having parallel second fold lines or roll axes this can also be obliquely oriented toward one another; a number of portions 15, 16 can be unfolded again, even after prefolding and pushing together, and can be rolled or folded towards the rear, i.e., away from the user in the installed state.

While the above description constitutes the preferred embodiment of the present invention, it will be appreciated that the invention is susceptible to modification, variation and change without departing from the proper scope and fair meaning of the accompanying claims.

The invention claimed is:

1. A method for folding a driver airbag, comprising the steps of providing the driver airbag with an insertion opening for a gas generator positioned on a back side of the airbag opposite a front side of the airbag and deploying away from the insertion opening towards a user after activation of the gas generator, laying out the airbag in a spread out state, after the laying out step, rolling or folding up a first partial region of the airbag in a direction along the back side of the airbag along a generally straight fold line, and after the rolling or folding step, folding the airbag in alternating directions around an imaginary center along a plurality of generally circular fold lines extending from the imaginary center, and pressing together the first partial region of the airbag towards the imaginary center.

2. The method according to claim 1 further comprising rolling or folding a second partial region about a second generally straight fold line, which lies opposite the first partial region in a direction along the back side.

3. The method according to claim 1 further comprising the position of the first partial region is upward in the installed state relative to the user.

4. The method according to claim 1 further comprising the folding or rolling up the first partial region of the airbag step is carried out multiple times.

5. An airbag module comprising a gas generator and an airbag that forms an insertion opening for the gas generator and the airbag deploying toward a user after activation of the gas generator, wherein the airbag is folded in a manner wherein a first partial region of the airbag is rolled up or folded up along a generally straight fold line towards a back side of the airbag forming the insertion opening, the airbag further thereafter being folded in alternating directions around an imaginary center along a plurality of generally circular first fold lines extending from the imaginary center, and pressed together the first partial region towards the imaginary center.

6. The airbag module according to claim 5, further comprising a second partial region of the airbag positioned opposite the first partial region wherein the second partial region is rolled up or folded up along a generally straight second fold line away from the user towards the insertion opening on the back side.

7. The airbag module according to claim 5 further comprising in that the first partial region is folded up or rolled up multiple times.

8. The airbag module according to claim 5 further comprising in that the airbag module is configured as a driver airbag module.

9. The airbag module according to claim 6 further comprising the position of the second partial region is downward in the installed state.

10. The airbag module according to claim 6, further comprising in that the first partial region of the airbag is rolled up or folded up along the generally straight fold line positioned in an upper portion of the airbag towards the insertion opening on the back side, and the second partial region of the airbag is rolled up or folded up along a second generally straight fold line positioned in a lower portion of the airbag towards the insertion opening on the back side.

11. The method according to claim 1 further comprising the rolling or folding up of the first partial region of the airbag is carried out by folding the first partial region along the generally straight fold line which is offset from the imaginary center.

12. The method according to claim 1 further comprising the folding the airbag in alternating directions is performed about a plurality of the generally circular fold lines in the form of generally concentric circular lines centered at the imaginary center.

13. The airbag module according to claim 5 further comprising a plurality of the generally circular fold lines forming generally concentric circles.

\* \* \* \* \*